US006521892B2

(12) United States Patent
Emanuel et al.

(10) Patent No.: US 6,521,892 B2
(45) Date of Patent: Feb. 18, 2003

(54) UNCOOLED DRIVER VIEWER ENHANCEMENT SYSTEM

(75) Inventors: Michael Emanuel, St.-Laurent (CA); Branislav Kovacevic, Pierrefonds (CA); Marcela Faina-Cherkaoui, Ormeaux (CA); Hubert Caron, Montreal (CA); Leslie Wrobel, Montreal (CA)

(73) Assignees: Thomson-CSF Optronics Canada Inc., St-Laurent (CA); Thomson-CSF Optronique Canada Inc., St-Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/248,507

(22) Filed: Feb. 10, 1999

(65) Prior Publication Data

US 2001/0045516 A1 Nov. 29, 2001

Related U.S. Application Data

(60) Provisional application No. 60/103,840, filed on Oct. 9, 1998.

(51) Int. Cl.[7] .................................................. G01J 5/02
(52) U.S. Cl. ................ 250/332; 250/339.09; 250/341.5
(58) Field of Search ........................ 250/332, 334, 250/330, 338.1, 338.4, 339.14, 342, 252.1, 339.09, 341.5; 359/350

(56) References Cited

U.S. PATENT DOCUMENTS

| 5,021,663 | A | * | 6/1991 | Hornbeck ..................... 250/349 |
| 5,063,607 | A | * | 11/1991 | FitzHenry et al. ............. 382/50 |
| 5,514,865 | A | * | 5/1996 | O'Neil ..................... 250/208.1 |
| 5,675,149 | A | | 10/1997 | Wood et al. |
| 5,677,533 | A | * | 10/1997 | Yaktine et al. ............... 250/342 |
| 5,729,016 | A | * | 3/1998 | Klapper et al. .............. 250/334 |
| 5,729,607 | A | * | 3/1998 | DeFries et al. ................. 380/6 |
| 5,799,106 | A | | 8/1998 | Mooney et al. |
| 5,994,699 | A | * | 11/1999 | Akagawa ..................... 250/332 |
| 6,023,061 | A | * | 2/2000 | Bodkin ........................ 250/332 |

FOREIGN PATENT DOCUMENTS

WO    97/15813    5/1997

* cited by examiner

*Primary Examiner*—Constantine Hannaher
*Assistant Examiner*—Albert Gagliardi
(74) *Attorney, Agent, or Firm*—Oblon, Spivak, McClelland, Maier & Neustadt, P.C.

(57) ABSTRACT

A thermal imager system for use in a vehicle utilizes an uncooled microbolometer detector array (19), optics (13) for conducting scene radiation to the array within a sensor module (12) which is separate from an image processing and display unit (39), to provide a small, direct view sensor module (12) that may be oriented for forward viewing. The sensor module (12) is mounted external to the vehicle and the image processing and display unit (39) is mounted internal to the vehicle, and the two are connected by a noise immune bidirectional digital communication path or harness (37). The optics (13) consist exclusively of refractive optical components (14, 16) providing a straight line radiation path from the scene to the array (19).

33 Claims, 3 Drawing Sheets

UNCOOLED DRIVER VIEWER ENHANCEMENT SYSTEM

This patent application claims priority upon U.S. Provisional patent application Serial No. 60/103,840, filed Oct. 9, 1998.

BRIEF DESCRIPTION OF THE INVENTION

The present invention relates generally to systems for viewing scenes, especially low light level or inaccessible scenes, and more particularly to systems for providing an enhanced view of a scene on a display for a viewer.

In recent years thermal imaging systems, based on uncooled detector arrays, have become an important aid in driving at night time and under adverse weather and battlefield conditions. Some systems are now available, mostly known as driver viewer enhancement or driver vision enhancing (DVE) systems. The DVE systems normally have a sensor module (SM) which produces a processed and corrected video image in analog form (RS 170 or other formats). The video image is presented on a display unit, sometimes referred to as display and control module (DCM). The DVE systems for military applications use prisms, mirrors and similar optical elements deviating one or more times, the radiation path from the scene to the sensor.

There is a demand for smaller and less costly thermal imaging systems. It is desirable that the SM be as small as possible to allow maximum flexibility in mounting the unit in armored vehicles, tactical wheeled vehicles and commercial vehicles. It is an advantage to reduce the cost of the system, especially cost driving components such as system optics.

The present invention provides solutions to the above problems by employing a unique system architecture which results in a very small SM, while using available technologies such as conventional optics and uncooled micro bolometer detector arrays. In this architecture there is a complete separation between the SM and the digital image processing unit, which is housed in the DCM. The present invention utilizes only refractive optical elements in a straight line radiation path from scene to sensor. This design allows the SM to be a very small unit relative to other existing sensor modules and benefits in improved performance.

The system of the present invention can be used in a variety of applications including a driving aid for various types of vehicles, mast mount sensors with remote display and control unit, helmet mounted sensors for fire fighting, soldiers, etc., and marine observation, railroad cars and other safety related remote monitoring applications. Additionally, the SM provides a "forward looking" system which is one in which all the optical elements are on the same optical axis oriented towards the scene to be imaged, as opposed to a periscopic system in which the optics are folded.

The DVE system is designed to work in a variety of host military vehicles, including combat vehicles and tactical wheeled vehicles. A partial list of vehicles include the LAV, Bradley, Abrams, M113, heavy equipment transport systems, heavy expanded mobility tactical trucks and high mobility multi-purpose wheeled vehicles. The DVE interface may be adapted to other families of combat and tactical vehicles, as well as commercial vehicles, marine vessels, etc.

In order to minimize the size of the sensor module, a new system concept has been developed. The SM contains only the necessary components that must be in direct view with the observed scene, i.e. optics, detector array and minimal required electronics. The rest of the electronics, including the image processing unit, are housed in the DCM. This desirable separation required technical solutions in order to make the system operational.

In accordance with one form of the invention, an image of a scene is acquired based on the infrared radiation emanating from the scene and the scene image is displayed at a location removed from the site of image acquisition by first projecting the scene infrared radiation onto an array of infrared sensitive elements. An infrared radiation level indicative analog signal is derived from each array element. Each analog signal is converted into a digital representation and transmitted to the display location where the digital representations are utilized to energize a correspondingly located element of a display device. The system and process include sensor array calibrating and other statistical processing performed at the display location. The present invention comprises a thermal imager system comprising an uncooled microbolometer detector array and optics of a sensor module separate from an image processing and display unit, thereby providing a small, direct view sensor module that may be oriented for forward viewing.

BRIEF DESCRIPTION OF THE DRAWINGS

Corresponding reference characters indicate corresponding parts throughout the several views of the drawing.

DETAILED DESCRIPTION OF THE INVENTION

List of acronyms:

| | |
|---|---|
| A/D | Analog to Digital |
| AMLCD | Active Matrix Liquid Crystal Display |
| CV | Combat Vehicle |
| D/A | Digital to Analog |
| DCM | Display/Control Module |
| DSP | Digital Signal Processor |
| DVE | Driver Viewer Enhancer |
| FPGA | Field Programmable Gate Array |
| IPB | Image Processing Board |
| IR | Infrared Radiation |
| LAV | Light Armored Vehicle |
| NUC | Non-uniformity Correction |
| PWA | Printed Wiring Assembly |
| RAM | Random Access Memory |
| SM | Sensor Module |
| TE | Thermo Electric |
| TI | Thermal Imager |
| TWV | Tactical Wheeled Vehicle |
| UFPA | Uncooled Focal Plane Array |

Figure 1:
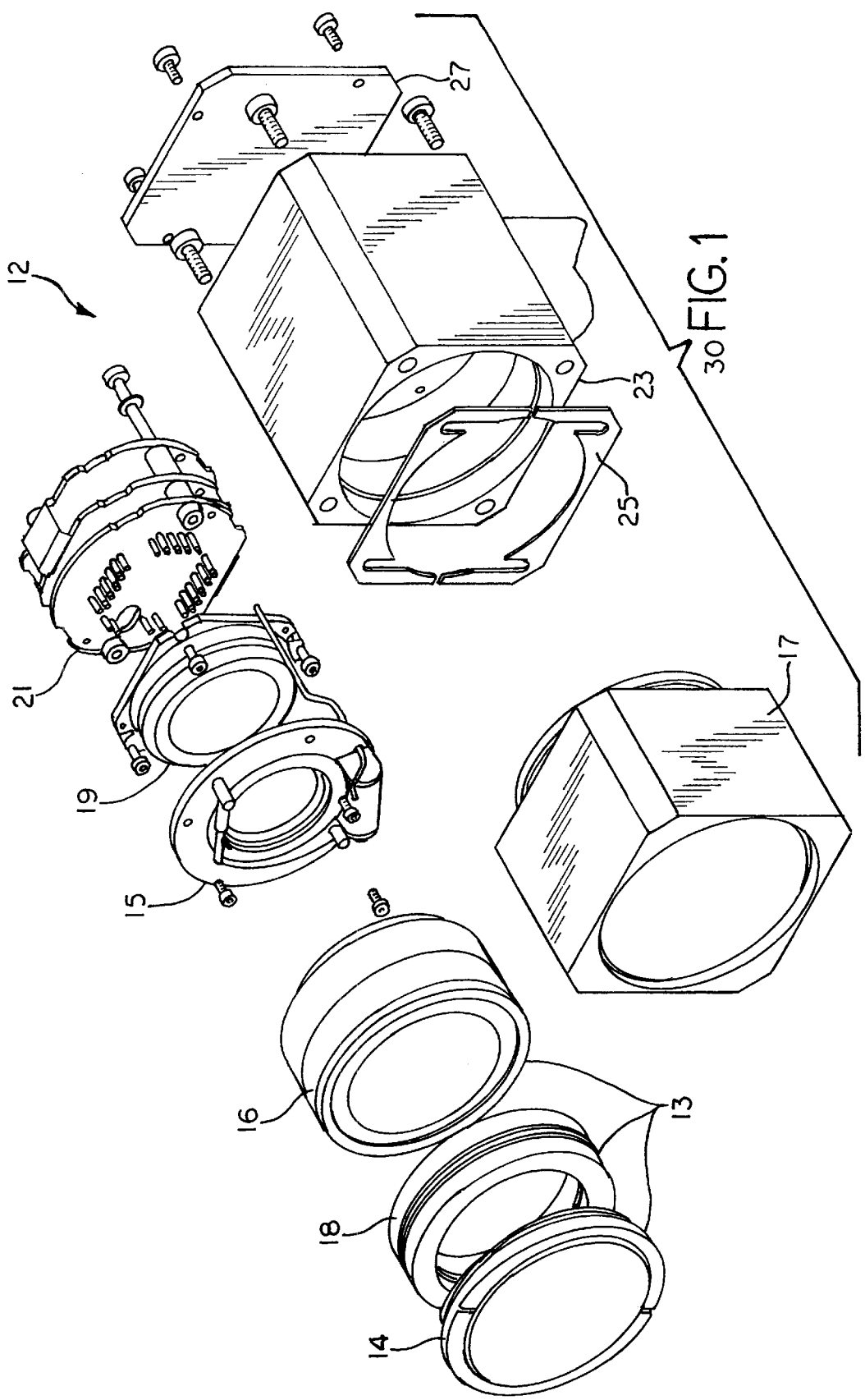
FIG. 1 is an exploded isometric view of the sensor module.

FIG. 1 shows the sensor module 12 in an exploded view. The system optics 13 are located in a housing portion 17 adjacent to a shutter 15. Incoming radiation 11 from a scene passes through the optics 13 and the normally open shutter 15, and is incident on the uncooled focal plane array 19. The SM housing 30 is composed of two main units, the optical sub-assembly housing portion 17 and the sensor and electronics housing portion 23. Each portion, designed as a module, contains components according to their prime function, thereby simplifying assembly, testing, and maintenance. When assembled, the SM housing 30 provides a hermetically sealed environment and may be equipped with a standard purge valve (not shown). The system optics 13 are located in housing portion 17. The shutter 15, and array 19, along with the sensor module electronics 21 are located in the housing portion 23. When assembled, the housing portions 17 and 23 and their contents are sealed by gaskets (not shown) and a service cover 27. Since the optics subassembly is housed in portion 17 that is a unit separable from SM housing portion 23, different optics subassemblies with different characteristics may be fitted in the SM.

The SM 12 has direct viewing optics 13 (unlike other DVE systems for armored vehicles which have periscopic designs), thus allowing a fast optical design (small F number) which improves the system thermal sensitivity.

The SM 12 utilizes an athermalized, focus free, three-element Germanium lens. The first element 14 has a hard carbon coating on its external surface. The second and third elements are mounted on a common cell 16, capable of moving along the main axis. An oil-filled metal bellows 18 between the first element 14 and the other two in cell 16 provides temperature compensation and keeps the lens focused on the UFPA 19 from 5 meters to infinity in the whole operating temperature range.

Figure 2:
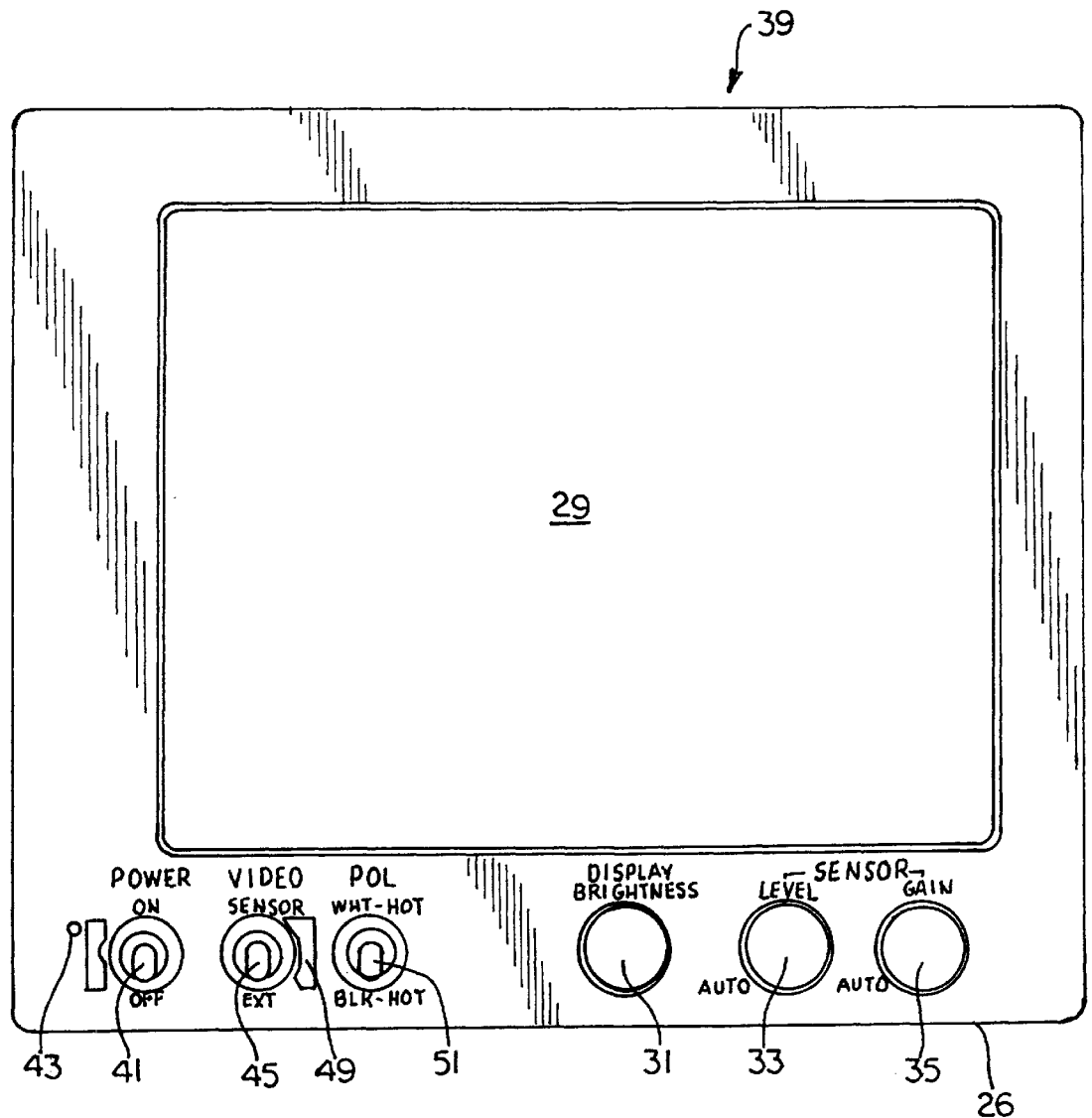
FIG. 2 is a front elevation view of the controls and display screen of the display and control module.

FIG. 2 illustrates the DCM 39 of the system from a user's perspective. The scene on which the SM is focused is displayed on an active matrix liquid crystal display (AMLCD) or other panel display 29 the brightness of which may be set by control 31. The user may also set the SM gain and level by controls 33 and 35.

Figure 3:
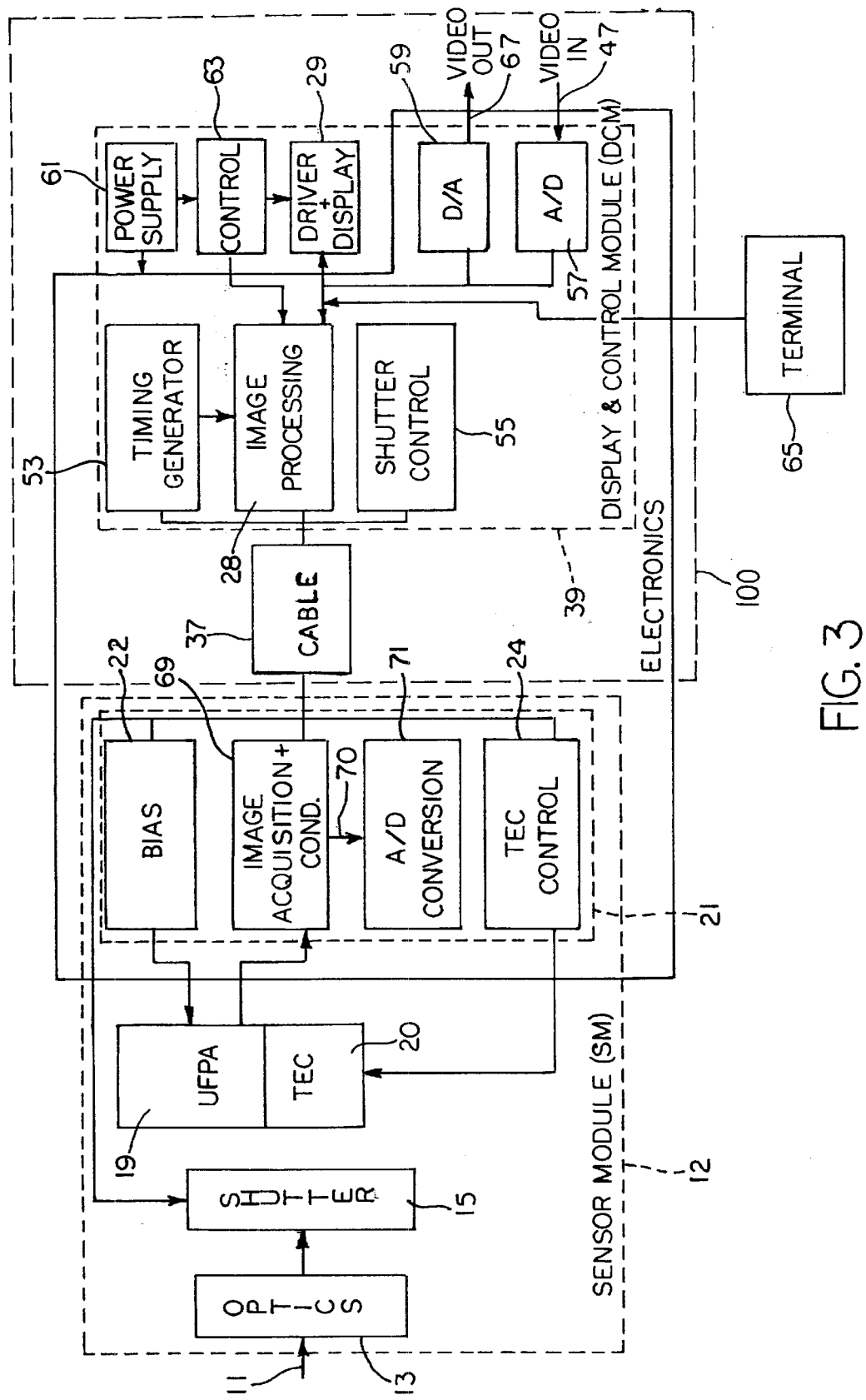
FIG. 3 is a block diagram of the overall system of the present invention.

Referring primarily to FIG. 3, the SM 12 produces a raw, untreated image in digital form. To make the remote image processing possible, a digital link including cable 37 is established between the SM 12 and DCM 39. This contributes to the provision of a small size sensor module.

The DVE unit functions as a passive thermal imager (TI), operating in the 8–12 micrometer range of the IR portion of the spectrum. The DVE employs Germanium optical elements, an uncooled focal plane array (UFPA, 320×240 elements) 19 based on microbolometer technology which includes a TE cooler 20 in the sensor module 12, and a flat panel display 29 based on active matrix liquid crystal technology (AMLCD, 640×480 pixels) in the DCM 39.

The UFPA electronics reside in the SM 12 and are incorporated into three printed wiring assemblies (PWA'S), interconnected via an integral flex harness. The first PWA 22 mates with the UFPA 19 and provides the array with the necessary low noise bias voltages. The second PWA 69 converts the coarse digital factors into an analog voltage, applies the coarse correction and converts the analog video information into a 14 bit digital signal. It also contains the memory device storing the coefficients of the specific UFPA calculated during the two point calibration procedure and used in normal processing for correction. The third PWA 24 is the Thermo-Electric cooler controller, which provides a stabilized temperature to the UFPA 19, for optimum performance.

The main components of the DCM 39 are the display housing 26, the display panel 29 and display electronics controls such as 31, 33 and 35, backlighting, and heaters, and an image processing board (IPB) comprising digital signal processor 28, timing generator 53, shutter control 55, analog to digital converter 57, and digital to analog converter 59.

The DCM uses a color 640×480 AMLCD type of display 29. The display is enhanced with polarizers to allow wide viewing angles. The thermal image is displayed in monochrome mode with 6-bit non-dithered gray levels. Overlay data, built-in-test messages and directional readout are processed in color.

All controls of the DVE are mounted on the DCM's front panel of display housing 26 as shown in FIG. 2. A toggle switch 41 provides the on/off control. The switch 41 is protected inside a bracket to avoid accidental operation. A green LED 43 indicates power on. The video source control toggle switch 45 selects the displayed image between the SM 12 image and an external video source received on Video In line 47 (see FIG. 3). The toggle switch 45 is also protected inside a bracket 49 to prevent accidental operation. Polarity toggle switch 51 selects between white/hot and black/hot of the SM image. The display brightness control 31 is a rotary control to set the display brightness (backlighting). The backlighting is designed to provide a readable image even in bright sunshine conditions, as well as in complete darkness. The backlighting provides a minimum brightness uniformity of 85% over the entire display area. There is a sensor gain rotary control 35 to adjust the sensor gain. In its locked position it provides automatic gain control which overrides the manual setting. There is also a sensor level rotary control 33 to adjust the sensor level. The level control 33 is non-operative when the gain control 35 is in automatic mode. The DCM is equipped with heaters to allow operation at low temperatures down to −40° C.

Several optional features not shown in FIG. 2 may be included. An optional night vision intensification system toggle switch selects the level and nature of display backlighting. When activated, it allows dimming to 0.05 footlambert, and provides filtered lighting to avoid detection by an image intensification device. A TWV horizontal direction control applies to TWV's only, and is considered a part of the interface kit discussed later. This electric control rotates the SM horizontally.

Referring to FIG. 3, image processing board (IPB) of the DCM is responsible for all main functions of the image. It includes a main DSP (digital signal processor) 28 for NUC (non-uniformity correction) and other real time processing, digital port communications, etc., a main FPGA for generating timing 53 and control signals for the UFPA, a dedicated video DSP for histogram remapping of the corrected 14-bit digital signal into 8-bit signal, a video FPGA for the video generator, and other display functions such as analog to digital converter 57 and D/A converter 59. The IPB interfaces to the power supply 61, control 63, SM electronics 21, digital port (for example, to an external terminal 65) and video in 47 and out 67 connectors.

The third major module of the DVE system is the cable 37 interconnecting the SM located outside the vehicle and the DCM 39. The cable carries all the signals needed to drive the UFPA and to transmit the infrared information in proper format for further processing and display by the DCM. These include power supply lines to drive the SM electronics, timing signals to read-out the video information from the UFPA, digital data resulting from conversion of analog signal data from the processing unit used for UFPA bias, coarse corrections and TE cooler temperature reference commands, and data carrying information on specific UFPA installed in the SM as well as directional sensing signals used to display the SM positional information and command signal from control 55 to the shutter 15.

The DVE processing electronics is divided into two sections. The SM 12 houses the electronics portion 21 which must be very close to the UFPA 19 for optimal system operation. The other part, the IPB and related components, is accommodated in the DCM 39. The two parts are digitally linked by cable 37 which provides a noise immune bidirectional digital communication path as illustrated in FIG. 3.

The analog signal acquired by the UFPA is buffered and coarsely corrected by image acquisition and conditioning circuitry 69. The analog signal on line 70 is then converted to 14-bit digital signal by AID converter 71 of the SM electronics 21. The signal is then multiplexed at a ratio of 2 to 1 and down streamed to image processor 28 of the IPB. Both the IPB and SM electronics have the required buffers to drive up to a fifteen meter long cable. The main DSP 28 performs the NUC and optical distortion correction and controls all other components of the IPB as the central processing unit. A 32-bit data bus presents the signal to the video generating portion of the IPB. The video DSP performs remapping of the 14-bit signal into a 8-bit signal, using a histogram equalization algorithm, as discussed subsequently, for contrast enhancement. A line doubler doubles each line/column for proper presentation of 320×240 UFPA pixels on a 640×480 pixel AMLCD 29. The signal is treated completely digitally from the output of the AID converter 71 to the AMLCD 29. No conversion to analog video takes place in the main video chain. A video digital to analog converter 59 converts the 8-bit digital signal into RS 170 (or CCIR) for external video display. An analog to digital converter 57 and timing generator allow display of an external RS 170 (CCIR) signal on the AMLCD 29.

In order to display a uniform image with a microbolometer UFPA 19, each detector element's output gain and offset must be corrected, a process known as non-uniformity correction (NUC). The NUC is performed by collecting and averaging data obtained at two different blackbody temperatures, T1 and T2. This process is called two-point calibration. The two-point calibration is done in the factory at the time of system assembly. The two-point calibration, when performed properly, reduces the spatial residual noise of the UFPA. The level of this noise depends, among other things, on the temperature difference between the two calibration points. The two-point calibration optimizes calibration at T1 and T2. However, due to non-linearity effects, the noise level between T1 and T2 is higher. To fine tune the offset to the actual scene temperature, a one-point calibration is needed. The one-point calibration is performed during system normal operation.

The normally open shutter 15, mounted in the SM 12 in front of the UFPA 19, is used for this purpose. The shutter is heatsunk to the SM housing 23, therefore its own temperature is a good representation of the outside ambient temperature. During the one-point calibration the shutter 15 closes for one or more frames, providing a uniform background to all UFPA 19 detector elements. The UFPA signals are read and stored in a buffer memory within the digital image processing portion 28 of the display and control module. When adequate data is collected, it is averaged and used to adjust the detector elements' offset for best picture uniformity. The one-point calibration is performed automatically at fixed time intervals (factory programmable). This process is completely transparent to the user. It is designed such that the presented image does not lag behind the real scene for more than 200 msec at all times.

An optional sensor directional readout may also be provided. A pin connector 41 on the DCM 39 has three lines dedicated for readout of a directional sensor located on the SM 12 mounting block or Interface Kit. The analog 0–5 Volt input signal is converted to digital and processed by the DSP. A graphical analog directional indication is provided on display 29. The directional readout may be turned on or off at factory level during system programming.

Recall that the signal is digitally processed at a 14-bit level. In order to display the processed image on the AMLCD, it must be converted to an 8-bit format. A few conversion methods are possible, such as a simple linear remapping. In linear remapping, though, it is not possible to display simultaneously details of both cold and hot objects which are at the extremes of the 14-bit dynamic range. As a result, details of the image are lost.

A more sophisticated method, called histogram equalization is preferred. A special algorithm has been developed for this purpose, implemented and executed by the video DSP 28 of the IPB. Every N frames a 14-bit histogram of the signal strength viewed by each detector element is collected and stored in the internal RAM of the video DSP 28. The histogram is then equalized and remapped over 256 gray levels. Each detector element is assigned an 8-bit gray level in accordance with this equalized histogram, which is stored in a look-up table in the video DSP's internal RAM. During the video readout process the video FPGA reads this look-up table and uses it for displaying the image. The displayed image is therefore contrast-enhanced and includes details of both extremes of the dynamic range. The histogram equalization process is activated whenever the gain control 35 is set to "AUTO".

The DVE unit is composed of two kits: the interface kit (not illustrated) which is vehicle specific and the TI kit which includes the DVE thermal imager, that is, the SM 12, DCM 39 and cable or harness 37 which interconnects the two modules. The interface kit is the electrical and mechanical interface between the thermal imager kit and the host vehicle. The DVE is designed so that the sensor module (SM) 12 is completely outside the vehicle (both CV and TWV). It may be mounted in place of the daysight periscope or anywhere else in the vehicle (in which case the interface kit would be different). This alternative mounting enables the use of a daysight periscope simultaneously with the DVE, and eliminates the need to remove and stow the DVE whenever the daysight periscope is preferred. When the DVE is not in use, the SM 12 may be folded for its maximum mechanical protection. In the folded position the optics are not oriented towards the front of the vehicle.

The method of acquiring an image of a scene based on the infrared radiation emanating from the scene and displaying the scene image at a location removed or remote from the site of image acquisition should now be clear. The refractive optical elements 14 and 16 project the scene infrared radiation 11 onto the array 19 of infrared sensitive elements. An infrared radiation level indicative analog signal is derived from each element. The analog signals are converted into digital representations and transmitted over the digital communication link or harness 37 to the display location where they are utilized to energize a correspondingly located element of display 29. The projecting, deriving and converting are performed external to the vehicle within the sensor module 12 while the utilizing step is performed within the vehicle at the location of the display 39.

Factory calibration of each element of the array may be performed to obtain analog signal correction factors at two distinct uniform temperature levels and data indicative of the calibration correction factors stored in the sensor module from which they are subsequently retrieved and utilized to correct each digital representation when energizing the corresponding display elements. On-line calibration of each element of the array may be performed to obtain an element analog signal correction factor at a uniform temperature level near ambient temperature and data indicative of the on-line calibration correction factors stored and similarly subsequently utilized to correct each digital representation when energizing the corresponding display elements. Such on-line calibration is accomplished by repeatedly temporarily blocking the optical path from the scene to the array for a very short time interval with an ambient temperature shutter 15.

Signal processing at the display location may also include a statistical correction, as discussed in detail above. The digital representations for each element may be periodically sampled and a histogram of the responses of all sensor elements or cells is maintained. This histogram may be normalized and stored for subsequent utilization in interpreting subsequently received digital representations and appropriately energizing the correspondingly located elements of the display. The histogram is periodically updated.

In summary, the unique DVE configuration of the present invention has a number of advantages over known prior vision enhancing schemes:

- The DVE system is designed so that its three components, SM 12, harness 37, and Display Control Module 39 are completely interchangeable with replacement components;
- The DVE system concept allows the incorporation of a relatively simple refractive optical design which is high performing with a wide field of view, fast F number and good overall transmittance;
- Identical and interchangeable TI kit for all vehicle applications (including CV and TWV);
- Simpler logistics and lower life cycle cost;
- Fast optics (F number 0.8), which results in a very sensitive system;
- Large field of regard (FOR) (vehicle dependent);
- Compact SM 12 which may be mounted elsewhere than the daysight hole in CV;
- Digital link between SM 12 and DCM (Display/Control Module) 39.

This concept eliminates the need to convert the digital signal to RS 170 (CCIR) at the SM 12 and deconvert the RS 170 (or CCIR) back to digital for display on the AMLCD 29. This makes the system more immune to noise pickup and results in overall better picture quality;

- Complete digital image processing in DCM 39. This allows flexibility in processing various data such as built-in-test, graphical directional readout on display, etc;
- This design allows retention of good picture quality, with little degradation, over the entire operating temperature range;
- The SM 12 is designed to be mounted outside the vehicle in all host vehicles, thus allowing more room for the driver inside the vehicle;
- The display housing 26 is mounted to allow the unit to be folded back when not in use;
- The DVE controls are designed in compatibility with MIL-H46885 and MIL-STD-1472. They can be operated with arctic gloves or nuclear, biological and chemical gloves;
- The sensor gain 35 has an auto lock position which activates the histogram equalization;
- The DVE TI Kit may be mounted, dismounted or transferred, as a whole or in part, from vehicle to vehicle by a single person in less than 10 minutes and without using special tools;
- The Display Panel 29 provides a good contrast under wide ambient light levels, from dark night, to bright sunshine, in wide viewing angles. The night vision intensification system option provides specially filtered backlighting to avoid detection by image intensification devices.

We claim:

1. A thermal imager system, comprising an uncooled microbolometer detector array and optics of a sensor module separate from an image processing and display unit, thereby providing a small, direct view sensor module that may be oriented for forward viewing, said sensor module including circuitry configured to apply a coarse correction to an analog output signal from the detector array and means for converting said analog output signal into a digital signal, said sensor module and said image processing and display unit being digitally linked.

2. The system in accordance with claim 1, wherein the sensor module is mounted externally of a vehicle and the image processing and display unit is mounted internally of the vehicle.

3. The system in accordance with claim 2, further including a noise immune bidirectional digital communication path coupling the sensor module and image processing and display unit.

4. The system in accordance with claim 1, wherein the optics consist exclusively of refractive optical components.

5. The system in accordance with claim 1, wherein the uncooled microbolometer detector array includes an array of infrared sensitive elements, and further comprising means for calibrating each element of the array of infrared sensitive elements to obtain analog signal correction factors at two distinct uniform temperature levels and means for storing data indicative of the correction factors.

6. The system in accordance with claim 5, further comprising means for correcting output signal from the detector array in accordance with the corresponding stored correction factors, an analog to digital converter configured to convert the analog corrected signals into corresponding corrected digital representations, and means for energizing the corresponding display elements with the corrected digital representations.

7. The system in accordance with claim 1, wherein the uncooled microbolometer detector array includes an array of infrared sensitive elements, and further comprising means for periodically calibrating each element of the array of infrared sensitive elements to obtain an element analog signal correction factor at a uniform temperature level near ambient temperature and means for storing data indicative of the correction factors.

8. The system in accordance with claim 7, further comprising means for correcting output signal from the detector array in accordance with the corresponding stored correction factors, an analog to digital converter configured to convert the analog corrected signals into corresponding corrected digital representations, and means for energizing the corresponding display elements with the corrected digital representations.

9. The system in accordance with claim 7, wherein the sensor module includes a shutter configured to repeatedly and automatically temporarily block an optical path from the scene to the array for a very short time interval at ambient temperature.

10. The system in accordance with claim 1, in combination with a vehicle, wherein sensor module is external of the vehicle and the display unit is within the vehicle.

11. The system in accordance with claim 1, further comprising means for periodically sampling digital representations of infrared radiation level indicative analog signals for each element, means for maintaining a histogram of all representatives, wherein the maintained histogram is equalized, stored, and utilized to interpret subsequently received digital representations and to energize appropriately the correspondingly located element of the display device.

12. The system in accordance with claim 11, wherein means for maintaining the histogram periodically updates the histogram.

13. A process of acquiring an image of a scene based on infrared radiation emanating from the scene and displaying the scene image at a display location removed from a site of image acquisition, comprising:

projecting the scene infrared radiation onto an array of infrared sensitive elements;

deriving an infrared radiation level indicative analog signal from each element;

applying a coarse correction to each analog signal;

converting each analog signal into a digital representation thereof, wherein the steps of projecting, deriving, applying and converting are performed by a unit connected to a noise immune bidirectional digital communication path;

transmitting via the path each digital representation to the display location; and utilizing each digital representation to energize at least one correspondingly located display element of a display device, wherein the step of utilizing is performed in a unit connected to the path.

14. The process of claim 13, including the initial step of calibrating each element of the array of infrared sensitive elements to obtain analog signal correction factors at two distinct uniform temperature levels and storing data indicative of the correction factors.

15. The process of claim 14, further comprising correcting the infrared radiation level indicative analog signal with the corresponding stored correction factors and wherein the step of utilizing includes using the corrected digital representations for energizing the corresponding display elements.

16. The process of claim 13, including the step of periodically and automatically calibrating each element of the array of infrared sensitive elements to obtain an element analog signal correction factor at a uniform temperature level near ambient temperature and storing data indicative of the correction factors.

17. The process of claim 16, further comprising correcting the infrared radiation level indicative analog signal with the corresponding stored correction factors and wherein the step of utilizing includes using the corrected digital representations for energizing the corresponding display elements.

18. The process of claim 16, wherein the step of periodically calibrating includes repeatedly and automatically temporarily blocking the optical path from the scene to the array for a very short time interval with an ambient temperature shutter.

19. The process of claim 13, wherein the step of projecting comprises a plurality of exclusively refractive steps.

20. The process of claim 13, for providing a view of an external scene to an occupant of a vehicle, wherein the steps of projecting, deriving and converting are performed external of the vehicle and the step of utilizing is performed within the vehicle.

21. The process of claim 13, wherein the step of utilizing includes periodically sampling the digital representations for each element, maintaining a histogram of the magnitude of the representations, equalizing the maintained histogram, storing the equalized histogram, and utilizing the stored equalized histogram to interpret subsequently received digital representations and energize appropriately the correspondingly located element of the display device.

22. The process of claim 21, including the additional step of periodically updating the histogram.

23. A thermal imager system comprising:

an array of infrared radiation detector cells;

an optical system for projecting infrared radiation emanating from a scene onto the array of infrared radiation detector cells;

a sensor module housing containing the array of cells and the optical system, said sensor module including circuitry configured to apply a coarse correction to an analog output signal from the array of cells corresponding to the detected infrared radiation;

means for converting said analog output signal into a digital signal;

an image processing and display module spaced from the sensor module for displaying an image of the scene; and a noise immune bidirectional digital communication path coupling the sensor module and the image processing and display module.

24. The system in accordance with claim 23, for use in a vehicle, wherein the sensor module is mounted external of the vehicle and the image processing and display module is mounted internal of the vehicle.

25. The system in accordance with claim 23, wherein the optical system consists exclusively of refractive optical components.

26. The system in accordance with claim 23, further comprising means for calibrating each element of the array of to obtain analog signal correction factors at two distinct uniform temperature levels and means for storing data indicative of the correction factors.

27. The system in accordance with claim 26, further comprising means for correcting output signal from the detector array in accordance with the corresponding stored correction factors, an analog to digital converter configured to convert the analog corrected signals into corresponding corrected digital representations, and means for energizing the corresponding display elements with the corrected digital representations.

28. The system in accordance with claim 23, further comprising means for periodically and automatically calibrating each element of the array of infrared sensitive elements to obtain an element analog signal correction factor at a uniform temperature level near ambient temperature and means for storing data indicative of the correction factors.

29. The system in accordance with claim 28, further comprising means for correcting output signal from the detector array in accordance with the corresponding stored correction factors, an analog to digital converter configured to convert the analog corrected signals into corresponding corrected digital representations, and means for energizing the corresponding display elements with the corrected digital representations.

30. The system in accordance with claim 28, wherein the sensor module includes a shutter configured to repeatedly and automatically temporarily block the optical path from the scene to the array for a very short time interval at an ambient temperature.

31. The system in accordance with claim 23, in combination with a vehicle, wherein sensor module is external of the vehicle and the display unit is within the vehicle.

32. The system in accordance with claim 23, further comprising means for periodically sampling digital representations of infrared radiation level indicative analog signals for each element, means for maintaining a histogram of the representations, wherein the maintained histogram is equalized, stored, and utilized to interpret subsequently received digital representations and to energize appropriately the correspondingly located element of the display device.

33. The system in accordance with claim 32, wherein the histogram for each cell is periodically updated by the means for maintaining the histogram.

* * * * *